United States Patent
Paillot et al.

(10) Patent No.: US 11,273,583 B2
(45) Date of Patent: Mar. 15, 2022

(54) POLYORGANOSILOXANE-BASED COMPOSITION INTENDED FOR TYRE MOULDING/STRIPPING

(71) Applicant: ELKEM SILICONES FRANCE SAS, Lyons (FR)

(72) Inventors: Karine Paillot, Charly (FR); Gérald Guichard, Givors (FR)

(73) Assignee: ELKEM SILICONES FRANCE SAS, Lyons (FR)

( * ) Notice: Subject to any disclaimer, the term of this patent is extended or adjusted under 35 U.S.C. 154(b) by 195 days.

(21) Appl. No.: 16/472,859

(22) PCT Filed: Dec. 18, 2017

(86) PCT No.: PCT/FR2017/000247
§ 371 (c)(1),
(2) Date: Dec. 23, 2019

(87) PCT Pub. No.: WO2018/115600
PCT Pub. Date: Jun. 28, 2018

(65) Prior Publication Data
US 2020/0384670 A1 Dec. 10, 2020

(30) Foreign Application Priority Data
Dec. 22, 2016 (FR) ..................... 1601828

(51) Int. Cl.
| | |
|---|---|
| C10M 169/04 | (2006.01) |
| B29C 33/64 | (2006.01) |
| B29C 37/00 | (2006.01) |
| B29D 30/06 | (2006.01) |
| C10M 107/50 | (2006.01) |
| C10M 173/02 | (2006.01) |
| C10N 20/02 | (2006.01) |
| C10N 40/36 | (2006.01) |

(52) U.S. Cl.
CPC .......... B29C 33/64 (2013.01); B29C 37/0067 (2013.01); B29D 30/0654 (2013.01); C10M 107/50 (2013.01); C10M 169/044 (2013.01); C10M 173/02 (2013.01); B29D 2030/0655 (2013.01); C10M 2201/02 (2013.01); C10M 2201/0876 (2013.01); C10M 2201/1056 (2013.01); C10M 2201/126 (2013.01); C10M 2229/0465 (2013.01); C10N 2020/02 (2013.01); C10N 2040/36 (2013.01)

(58) Field of Classification Search
CPC . B29C 33/64; B29C 37/0067; B29D 30/0654; B29D 2030/0655; C10M 107/50; C10M 169/044; C10M 173/02; C10M 2201/02; C10M 2201/0876; C10M 2201/1056; C10M 2201/126; C10M 2229/0465; C10M 2201/04; C10M 2201/102; C10M 2201/103; C10M 2201/12; C10M 2207/123; C10M 2209/104; C10M 2209/12; C10M 2219/104; C10M 2223/042; C10M 2229/025; C10M 2229/041; C10M 2229/042; C10M 2229/0515; C10N 2020/02; C10N 2040/36; C10N 2010/06; C10N 2010/02; C10N 2030/06
See application file for complete search history.

(56) References Cited

U.S. PATENT DOCUMENTS

| | | | |
|---|---|---|---|
| 3,194,767 | A | 7/1965 | Berry |
| 3,862,919 | A | 1/1975 | Nitzsche et al. |
| 4,840,742 | A | 6/1989 | Hoffman |
| 8,455,562 | B2 | 6/2013 | Maliverney |
| 8,470,899 | B2 | 6/2013 | Maliverney |
| 8,470,951 | B2 | 6/2013 | Maliverney |
| 8,623,985 | B2 | 1/2014 | Maliverney |
| 8,987,176 | B2 | 3/2015 | Breunig |
| 9,150,755 | B2 | 10/2015 | Maliverney et al. |
| 10,301,567 | B2 | 5/2019 | Breunig et al. |
| 2010/0078104 | A1 | 4/2010 | Breunig et al. |
| 2016/0376517 | A1* | 12/2016 | Breunig .............. B29C 37/0067 264/320 |

FOREIGN PATENT DOCUMENTS

| | | |
|---|---|---|
| BE | 842305 | 11/1976 |
| EP | 0022706 A1 | 1/1981 |
| EP | 0147323 | 7/1985 |
| EP | 0235049 | 9/1987 |
| EP | 1240283 | 9/2002 |
| EP | 1495076 | 1/2005 |
| EP | 1899447 | 3/2008 |
| EP | 2038354 | 3/2009 |
| FR | 2149519 | 3/1973 |
| GB | 1082179 | 9/1967 |

(Continued)

OTHER PUBLICATIONS

International Search Report and Wrillen Opinion dated Mar. 5, 2018 in corresponding International Patent Application No. PCT/FR2017/000247, filed Dec. 18, 2017, 12 pages.
Www Sovitec Com, "Technical Data Sheet Engineering Plastics I Fillers I Microperl I Main use I Top fillers for engineering plastics I Chemical composition I Soda lime glass I Particle size distribution I", Jan. 1, 2016, Retrieved from: URL:http://www.sovitec.com/sites/sovitec/files/2016-06/Sovitec_TDS_En_Microperl_1.pdf, 2 pages.
Abouhilale, Samir et al., "Perfluoroalkylated fatty acid monoesters of trehalose and sucrose for biomedical applications: Remarkable emulsifying properties of 6-O-[3'-(perfluorooctyl) propanoyl]-trehalose", Journal of the American Oil Chemists' Society (JAOCS), vol. 69, No. 1, pp. 1-8 (Jan. 1992).

(Continued)

*Primary Examiner* — Taiwo Oladapo
(74) *Attorney, Agent, or Firm* — Sheppard, Mullin, Richter & Hampton LLP

(57) ABSTRACT

The present invention relates to compositions in the form of silicone oil emulsions intended to be applied to curing bladders as a mould-release agent during tyre production.

11 Claims, No Drawings

(56) References Cited

FOREIGN PATENT DOCUMENTS

| | | |
|---|---|---|
| GB | 1289900 | 9/1972 |
| WO | 94/21233 | 9/1994 |
| WO | 01/40417 | 6/2001 |
| WO | 03/087227 | 10/2003 |
| WO | 2007/003731 | 1/2007 |
| WO | 2007/147787 | 12/2007 |
| WO | 2010/146253 | 12/2010 |
| WO | 2010/149869 | 12/2010 |
| WO | 2010/149870 | 12/2010 |
| WO | 2010146254 | 12/2010 |
| WO | 2013/004926 | 1/2013 |
| WO | 2015/090547 | 6/2015 |
| WO | WO2015090547 A1 * | 6/2015 |
| WO | WO-2016076180 A1 * | 5/2016 ............... C08K 3/40 |

OTHER PUBLICATIONS

Petit, F. et al., "Hydrophobically modified polyelectrolytes with perfluorinated or hydrogenated side alkyl chains. Comparison of the associating behavior", Journal de Chimie Physique et de Physico-Chimie Biologique, vol. 93, pp. 887-898 (1996).

Noll, Walter, "Chapter 8.1: Technology of Silicone Rubbber", Chemistry and Technology of Silicones, 1st Edition, Academic Press, p. 397 (1968).

* cited by examiner

POLYORGANOSILOXANE-BASED COMPOSITION INTENDED FOR TYRE MOULDING/STRIPPING

CROSS-REFERENCE TO PRIOR APPLICATIONS

This application is a National Stage of PCT/FR2017/000247, filed Dec. 18, 2017, and designating the United States (published on Jun. 28, 2018, as WO, 2018/115600A1) which claims foreign priority under 35 U.S.C. § 119 to French Patent Application No. FR 1601828, filed Dec. 22, 2016, each hereby expressly incorporated by reference in its entirety and each assigned to the assignee hereof.

The present invention relates to compositions in the form of a silicone oil emulsion, which are intended to be applied to vulcanization bladders and/or to pneumatic or semi-pneumatic tires, to make molding/demolding easier during the manufacture of tires.

The invention relates in particular to an application as a lubricating composition which is particularly suitable for the lubrication of vulcanization bladders used during the shaping and vulcanization of pneumatic or semi-pneumatic tires.

The invention also relates to the vulcanization bladders coated with a lubricating composition and/or an adhesion primer according to the invention and to the pneumatic or semi-pneumatic tires coated with said lubricating composition.

Finally, the present invention relates to a method for lubricating an expandable rubber bladder of use during a vulcanization of a green tire within a metal press, characterized in that compositions in the form of emulsions of silicone oils are applied to the inner surface of the green tires and/or to the outer surface of the vulcanization bladders to facilitate the molding-demolding thereof during the manufacture of said tires.

The manufacture of a tire mainly comprises three steps, namely the preparation of the semi-finished products, the assembly of the latter and the curing of the tire casing.

The preparation of the semi-finished products consists in producing the constituents of the tire casing: rubbers, textile and metal plies, bead wires.

The assembly step consists in superposing the various semi-finished products, with a view to forming the tire. The carcass, consisting of various inner layers: inner liner, carcass ply, bead wires, and all the plies of rubbers, is placed on a cylinder having the diameter of the tire: the drum. After shaping, the drum giving the carcass its toric appearance, the belt plies and the tread are positioned: a green tire, an unvulcanized and unshaped tire casing, which is still plastic is obtained. At the end of the assembly step, the future tire is also referred to as a green tire or green tire casing. Its cohesion is guaranteed simply by the green tack of the products.

Finally, the curing changes the tire from the plastic state to the elastic state owing to the formation of sulfur bridges between the elastomer chains: this is the vulcanization. Curing creates the composite structure between the various elements of the tire casing. The compounds adhere to one another, the plies and the threads mix together. In-mold vulcanization is carried out in metal presses using the combined action of heat and pressure. The green tire is heated simultaneously on the outside, for example with steam circulating inside the walls of the mold and on the inside, as a general rule with a pressurized hot fluid contained in a rubber membrane, also referred to as an expandable bladder.

The hot fluid such as a hot gas, hot water and/or steam, participates in the heat transfer for the vulcanization.

The pressure, generally above 10 bar, usually between 15 and 25 bar, serves to compress the tire from the inside and to apply it against the mold so that it can adopt the shape, the tread patterns and the markings that have been engraved in said metal mold.

The vulcanization time varies as a function of the dimensions of the tire, the operating techniques and the compounds used: it is approximately 15 minutes for a motor vehicle tire and may reach 24 hours or more for large tires intended for earth-moving machinery. The vulcanization temperature is in general between 80 and 220° C.

This operation makes the rubber compound lose its initial plasticity oy giving it stable elastic properties.

The tire casing is then partially cooled in the mold, this cooling being sometimes promoted by the introduction of cold or cooler water into the bladder. Then the mold is opened and the bladder is deflated by releasing the pressure of the internal fluid, and the vulcanized tire is removed from the press. This use of vulcanization bladders is well known in the art.

It is accepted that there is a sizeable relative movement between the outer contact surface of the bladder and the inner surface of the green tire casing during the bladder expansion phase before the complete vulcanization of the tire casing. Similarly, there is also a considerable relative movement between the outer contact surface of the bladder and the inner surface of the molded and vulcanized tire casing, during the deflation of the bladder and the extract on from the tire.

If adequate lubrication is not provided between the bladder and the inner surface of the tire casing, the bladder generally has a tendency to warp, which leads to a deformation of the tire casing in the mold and also excessive wear and roughening of the surface of the bladder itself. The surface of the bladder also tends to adhere to the inner surface of the tire casing during the curing. After the vulcanization of the tire casing and in particular during the final part of the vulcanization cycle of the tire casing during which the bladder is deflated, the latter then remains inseparably bonded to the tire.

It is a question of demolding two rubber surfaces, namely the inner surface of the vulcanized tire from the outer surface of the bladder and not the outer surface of the vulcanized tire from the inner surface of the metal mold. EP 022 706 describes an agent for molding rubber articles to be deposited on the outer surface of the rubber blank in contact with the mold.

Furthermore, the bladder must be able to be reused without new treatment for other molding/demolding cycles. For this reason, the outer surface of the bladder or the inner surface of the green or unvulcanized tire casing is coated with an appropriate lubricant or mold release agent.

The use of a multi-demolding mold release agent enables tire manufacturers to improve the productivity by reducing the rate of appearance of defects and by reducing the frequency of treatments by said mold release agent.

The lubrication of the vulcanization bladder used during the shaping and vulcanization of the green tires may be carried out in two different ways.

The expandable rubber bladder used during the vulcanization of the green tires is initially coated with a lubricating composition. The lubrication of the bladder is direct.

According to an alternative, the mold release agent is applied to the inside of the green tire which will be in contact with the expandable bladder. Then, the green tire is introduced inside the press. The mold is closed and the bladder is inflated. The mold release agent ensures the optimal centering of the bladder inside the tire which is necessary for obtaining perfect symmetrical tires. It also helps to prevent defects of the bladder such as pinching and creasing. When the metal mold is closed and the bladder completely deployed, the temperature is increased up to 220° C. During this phase, the mold release agent must be resistant to the temperature and must transfer from the inner face of the tire to the outer face of the bladder. This transfer is desirable for increasing the number of successive demolding operations without new application of the mold release agent. The tire is vulcanized in the closed press, with the bladder completely deployed by a pressurized fluid, between 150 and 220° C. During this step, the tire must not adhere to the bladder. The film of mold release agent forms the necessary barrier between the tire and the bladder. The nonstick effect of the mold release agent is provided by the creation of a continuous separating layer between the bladder and the inner face of the tire. This is the main function of a bladder mold release agent. If the barrier has defects, the vulcanization of the tire may be carried out on the rubber of the bladder, rendering the separation of the two impossible without destructive failure. After vulcanization, the bladder is deflated. The mold release agent must provide the nonstick effect, enabling the bladder to be detached from the tire. The mold release agent that enables several demolding operations is not applied to each tire. It must therefore have a high durability. The durability of the layer of mold release agent is that which makes the mold release agent a multi-demolding mold release agent. The mold release agent is again applied after a certain number of molding/demolding cycles.

The advantage of applying the mold release agent to the inside of the green tire is that this is carried out outside of the press, thus avoiding any inopportune pollution thereof.

Silicone compositions that can be crosslinked to elastomers for facilitating the molding-demolding during the manufacture of tires are known.

Thus, patents EP 1 240 283, EP 1 495 076 and patent application EP 2 038 354 relate to lubricating compositions based on siloxanes capable of crosslinking by polycondensation and that therefore do not release hydrogen.

Patent application EP 1 899 447 and U.S. Pat. No. 4,840,742 relate to silicone compositions capable of crosslinking by dehydrogenation-condensation.

Patent application WO2015090547 relates to a method for lubricating an expandable rubber bladder of use during a vulcanization of a green tire within a metal press, characterized in that compositions in the form of emulsions of silicone oils comprising glass beads as spherical amorphous filler are applied to the inner surface of the green tires and/or to the outer surface of the vulcanization bladders to facilitate the molding-demolding thereof during the manufacture of said tires. Nonetheless, the presence of glass beads, which promotes the evacuation of air during the step of shaping and vulcanization of the tyres, tends to decrease the stability of the emulsions in terms of pH and of loss of ≡SiH functions.

The document entitled "Materials-Handling-Guide-Hydrogen-Bonded-Silicon-Compounds", published in August 2007 by SEHCS (Silicones Environmental, Health and Safety Council of North America), relates to the safety of products containing ≡SiH.

It is known by those skilled in the art that the silicon-hydrogen bond is extremely reactive, all the more so in the presence of water, for example in an emulsion. This hydrolysis reaction may be accelerated in the presence of other chemical compounds, for instance acids or bases. It may be very fast and highly exothermic. This hydrolysis reaction releases inflammable hydrogen as by-product:

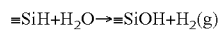

$$\equiv SiH + H_2O \rightarrow \equiv SiOH + H_2(g)$$

The hydrogen released may form mixtures that are explosive with air.

Thus, an inopportune leak of gaseous hydrogen may lead to serious risks to the health and safety of operators and also industrial facilities and must therefore be managed. It is very important to control the pH of the aqueous emulsions of poly(methylhydro)siloxanes in order to minimize the release of hydrogen.

In this context the stability of the lubricating emulsions based, respectively, on crosslinking agent having ≡SiH functions and on glass beads must be continuously improved while retaining lubrication properties, namely properties of slip and of resistance to successive demolding operations.

One aim of the present invention is to provide mold release agent compositions with improved storage stability in terms of pH and of loss of ≡SiH functions, making it possible to obtain a bladder that simultaneously meets these requirements, namely properties of slip and of resistance to successive demolding operations.

To this end, the first subject of the invention relates to a mold release agent composition (I) in emulsion form, comprising:
(a) at least one reactive polyorganosiloxane (A) comprising at least two silanol groups ≡SiOH per molecule;
(b) at least one crosslinking agent (B) having at least three ≡SiH units per molecule;
(c) at least one non-reactive linear polyorganosiloxane oil (C) which is a linear homopolymer or copolymer which has, per molecule, monovalent organic substituents, which are identical to or different from one another, bonded to the silicon atoms, and which are selected from the group consisting of $C_1$-$C_6$ alkyl radicals, $C_3$-$C_8$ cycloalkyl radicals, $C_6$-$C_{10}$ aryl radicals and $C_7$-$C_{15}$ alkylaryl radicals;
(d) glass beads (D) as spherical amorphous filler;
(e) at least one surfactant (E);
(f) optionally at least one additive (F) selected from the group consisting of a film-forming polymer, a complementary lubricant, an antifriction agent, a coalescence agent, a wetting of dispersing agent, a mineral filler, an antifoam agent, a thickener, a stabilizer, an acidifying agent, a biocide and an antifungal agent;
(g) optionally at least one dehydrogenation-condensation catalyst (G); and
(h) water (H);
the amounts of surfactant(s) and water being sufficient to obtain an oil-in-water emulsion; characterized in that the composition of the glass beads (D) is as follows:
the content of silicon expressed as $SiO_2$ is less than 63% by weight,
the content of calcium expressed as CaO is greater than 20% by weight,
the content of sodium expressed as $Na_2O$ is less than 2.9% by weight,
the content of aluminum expressed as $Al_2O_3$ is between 0.5% and 15% by weight,
the content of boron expressed as $B_2O_3$ is between 0.2% and 2.5% by weight,
the content of potassium expressed as $K_2O$ is between 0.35% and 1% by weight, and
the content of magnesium expressed as MgO is between 1% and 4% by weight, relative to the total weight of $SiO_2$, CaO, $Na_2O$, $Al_2O$, $B_2O_3$, $K_2O$ and MgO.

The composition of the glass beads (D) may be established by plasma torch atomic emission spectrometry according to standard ISO 21587 (2007).

The mold release agent composition (I) may be obtained by mixing emulsions containing, as predominant constituents, the constituents (A), (B) and (C) alone or in a mixture.

Stable composition is intended here to mean a composition, the pH of which does not increase on storage by more than 10% relative during a period of 60 days at 50° C., which are the accelerated aging test conditions conventionally accepted by those skilled in the art as being equivalent to one year of aging at ambient temperature.

The improvement in the stability of the emulsion obtained by virtue of the invention is directly reflected by a pH which is more stable in the context of the invention and therefore less hydrogen released, which means a significant drop in the loss of SiH.

In order to describe the polyorganosiloxanes, reference is made to M, T, D and Q units. M represents the monofunctional unit of formula $(R)_3SiO_{1/2}$, the silicon atom being bonded to a single oxygen atom in the polymer comprising this unit. The letter D signifies a difunctional unit $(R)_2SiO_{2/2}$ in which the silicon atom is bonded to two oxygen atoms. The letter T signifies a trifunctional unit of formula $(R)SiO_{3/2}$ in which the silicon atom is bonded to three oxygen atoms. The letter Q signifies a trifunctional unit of formula $SiO_{4/2}$ in which the silicon atom is bonded to four oxygen atoms. The symbol R has the same meaning as the symbols $R^2$, $R^3$ and $R^4$ defined below. The units M, D and T may be functionalized. Reference is then made to units M, D and T while specifying the specific radicals.

Preferably, the reactive polyorganosiloxane (A) of the mold release agent composition (I) comprises the following siloxy units:

$$M^{OH}=[(OH)(R^2)_2SiO_{1/2}] \text{ and } D=[R^3R^4SiO_{2/2}]$$

wherein:
$R^2$, $R^3$ and $R^4$ are identical or different radicals selected from the group consisting of:
 linear or branched $C_1$-$C_6$ radicals, for instance methyl, ethyl, propyl, isopropyl, butyl, isobutyl, t-butyl, n-pentyl, n-hexyl,
 $C_3$-$C_8$ cycloalkyl radicals, for instance cyclopentyl, cyclohexyl,
 $C_6$-$C_{10}$ aryl radicals, for instance phenyl, naphthyl, and
 $C_7$-$C_{15}$ is alkylaryl radicals, for instance tolyl, xylyl.

Even more preferentially, the reactive polyorganosiloxane (A) of the mold release agent composition (I) is an α,ω-bis(hydroxy)polydimethylsiloxane, which means that the radicals $R^2$, $R^3$ and $R^4$ of the siloxy units of the reactive polyorganosiloxane (A) are methyl radicals.

Preferably, the reactive polyorganosiloxane (A) has a dynamic viscosity of between 50 and 600 000 mPa·s at 25° C. or a consistency of between 200 and 2000 expressed in tenths of millimeters at 25° C.

The dynamic viscosity of the silicones is measured at 25° C. according to standard ASTM D 445.

The term "gum" is used for organosilicic compounds having viscosities conventionally greater than ~600 000 mPa·s, which corresponds to a molecular weight of greater than 260 000 g/mol.

The consistency or penetrability of a gum is determined at 25° C. by means of a penetrometer of PNR12 type or equivalent model which makes it possible to apply a cylindrical head, under standardized conditions, to the sample.

The penetrability of a gum is the depth, expressed in tenths of millimeters, to which a calibrated cylinder penetrates into the sample over the course of one minute.

To this end, a sample of gum is introduced into an aluminum bucket 40 mm in diameter and 60 mm in height. The bronze or brass cylindrical head measures 6.35 mm in diameter and 4.76 mm in height and is carried by a metal rod 51 mm long and 3 mm in diameter, which is suitable for the penetrometer. This rod is ballasted with an overload of 100 g. The total weight of the assembly is 151.8 g, including 4.3 g for the cylindrical part and its support rod. The bucket containing the sample of gum is placed in the bath thermostated at 25° C.±0.5° C. for a minimum of 30 min. The measurement is carried out according to the constructor's instructions. The values of the depth (V) in tenths of millimeters and the time (t) in seconds to achieve this depth are indicated on the apparatus. The penetrability is equal to 60 V/t expressed in tenths of millimeters per minute.

The silicone gums of use in accordance with the invention are used alone or as mixture in an inorganic solvent. This solvent may be selected from volatile silicones, octamethylcyclotetrasiloxane (D4), decamethylcyclopentasiloxane (D5), polydimethylsiloxane (PDMS) oils, polyphenylmethylsioxane (PPMS) oils or mixtures thereof, in order to avoid the use of organic solvents that are harmful to the environment and to the health of the workers in tire manufacturing workshops.

An α,ω-bis(hydroxy)polydimethylsiloxane oil of dynamic viscosity of between 50 and 600 000 mPa·s at 25° C. and an α,ω-bis(hydroxy)polydimethylsiloxane gum of consistency of between 200 and 2000 expressed in tenths of millimeters at 25° C. are preferentially used as constituents (A).

Preferably, the crosslinking agent (B) of the mold release agent composition (I) is a polyorganosiloxane selected from those which have at least one unit of formula (II) and which are terminated by units of formula (III) or cyclic units consisting of units of formula (II) represented below:

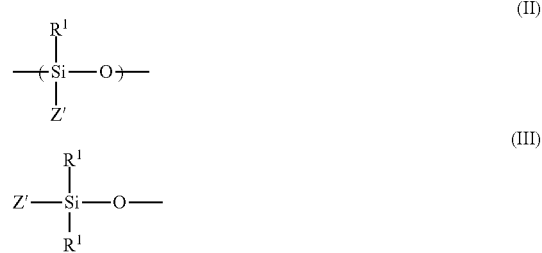

in which:
 the symbols $R^1$ are identical or different and represent:
  a linear or branched alkyl radical containing 1 to 8 carbon atoms, which is unsubstituted or which is substituted by at least one fluorine,
  a cycloalkyl radical containing between 5 and 8 cyclic carbon atoms, or
  an aryl radical containing between 6 and 12 carbon atoms,
  an aralkyl radical having an alkyl part containing between 7 and 14 carbon atoms and an aryl part containing between 6 and 12 carbon atoms, unsubstituted or substituted on the aryl part with halogens, alkyls and/or alkoxyls containing 1 to 3 carbon atoms, the symbols Z' are identical or different and represent:
a hydrogen radical, or
a group corresponding to the same definition as that given above for $R^1$,
with at least three of the symbols Z' per molecule representing a hydrogen radical H.

As example of crosslinking agent (B), mention may be made of the compound of following formula (IV):

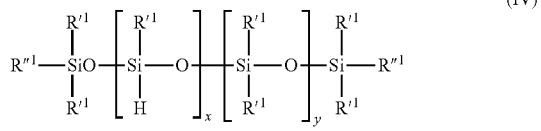

(IV)

in which:
x represents an integer or fractional number ranging between 1 and 10 000,
y represents an integer or fractional number ranging between 0 and 10 000,
$R'^1$ and $R'''^1$ represent, independently of one another:
a linear or branched alkyl radical containing 1 to 8 carbon atoms, unsubstituted or substituted with at least one halogen, preferably fluorine, the alkyl radicals preferably being methyl, ethyl, propyl, octyl and 3,3,3-trifluoropropyl,
a cycloalkyl radical containing between 5 and 8 cyclic carbon atoms,
an aryl radical containing between 6 and 12 carbon atoms,
an aralkyl radical having an alkyl part containing between 6 and 14 carbon atoms and an aryl part containing between 6 and 12 carbon atoms, unsubstituted or substituted on the aryl part,
$R'''^1$ possibly also corresponding to hydrogen, and
with the proviso that the polyorganosiloxane comprises at least three ≡SiH units.

The following compounds are most particularly suitable for the invention as crosslinking agent B:

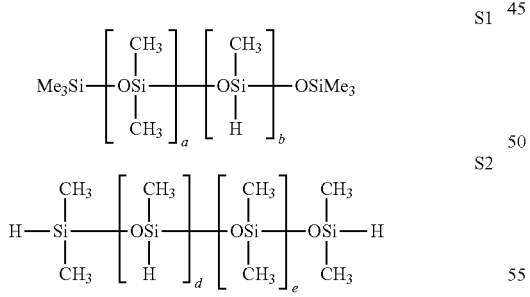

S1

S2 with a, b, d and e representing a number ranging from:
in the polymer of formula S1:
$0 \leq a \leq 10\,000$, preferably $0 \leq a \leq 8000$, preferably $0 \leq a \leq 5000$, and
$3 \leq b \leq 10000$, preferably $10 \leq b \leq 100$, preferably $20 \leq b \leq 60$,
in the polymer of formula S2:
$1 \leq d \leq 10\,000$, preferably $20 \leq d \leq 60$, and
$0 \leq e \leq 10000$, preferably $0 \leq e \leq 1000$.

In the context of the invention, "non-reactive" is intended to mean an oil which, under the conditions of emulsification, of preparation of the lubricating composition and of use, does not react chemically with any of the constituents of the composition.

Preferably, the non-reactive linear polyorganosiloxane oil (C) has a dynamic viscosity of the order of 0.65 to 100 000 mPa·s at 25° C. As examples, mention may be made of the linear polyorganosiloxanes:
consisting, along each chain:
of units of formula $R^5R^6SiO_{2/2}$, optionally combined with units of formula $(R^5)_2SiO_{2/2}$,
of units of formula $(R^6)_2SiO_{2/2}$, optionally combined with units of formula $(R^5)_2SiO_{2/2}$,
of units of formula $R^5R^6SiO_{2/2}$ and of units of formula $(R^6)_2SiO_{2/2}$, optionally combined with units of formula $(R^5)_2SiO_{2/2}$,
and blocked at each chain end by a unit of formula $(R^7)_3SiO_{1/2}$, the $R^7$ radicals of which, which are identical or different, are selected from $R^5$ and $R^6$;
in which the $R^5$ and $R^6$ radicals, monovalent organic substituents of the various siloxy units mentioned above, have the following definitions:
the $R^5$ radicals, which are identical or different to one another, are selected from:
linear $C_3$-$C_6$ or branched $C_3$-$C_6$ alkyl radicals, for instance methyl, ethyl, propyl, isopropyl, butyl, isobutyl, t-butyl, n-pentyl, n-hexyl,
$C_3$-$C_8$ cycloalkyl radicals, for instance cyclopentyl, cyclohexyl, and
linear $C_2$-$C_8$ or branched $C_3$-$C_8$ alkenyl radicals, for instance vinyl, allyl,
the $R^6$ radicals, which are identical or different to one another, are selected from:
$C_6$-$C_{10}$ aryl radicals, for instance phenyl, naphthyl,
$C_7$-$C_{15}$ alkylaryl radicals, for instance tolyl, xylyl, and
$C_7$-$C_{15}$ arylalkyl radicals, for instance benzyl.

The chemical composition of the glass beads (D) may be determined by plasma torch atomic emission spectrometry according to standard ISO 21587 (2007).

Preferably, the glass beads have the following chemical composition:
the content of silicon expressed as $SiO_2$ is between 55% and 63% by weight,
the content of calcium expressed as CaO is between 20% and 27% by weight,
the content of sodium expressed as $Na_2O$ is between 0.1% and 2.9% by weight,
the content of aluminum expressed as $Al_2O_3$ is between 9.1% and 15% by weight,
the content of boron expressed as $B_2O_3$ is between 0.2% and 1% by weight,
the content of potassium expressed as $K_2O$ is between 0.35% and 1% by weight, and
the content of magnesium expressed as MgO is between 1% and 4% by weight, relative to the total weight of $SiO_2$, CaO, $Na_2O$, $Al_2O_3$, $B_2O_3$, $K_2O$ and MgO.

The amount of glass beads (D) in the mold release agent composition (I) varies between 0.1 and 20% by weight and preferably between 0.1 and 15% by weight relative to the total weight of the composition.

Preferably, the glass beads (D) have a mean particle diameter measured according to standard ISO 13320 of between 0.1 and 150 μm.

The nature of surfactant (E) will be readily determined by those skilled in the art, with the aim being to prepare a stable emulsion. Anionic, cationic, non-ionic and zwitterionic surfactants may be used atone or in a mixture.

It should be noted that the composition (I) according to the invention may also comprise protective colloids such as polyvinyl alcohol.

As anionic surfactant, mention may be made of the following surfactants:

alkyl ester sulfonates of formula $R^a$—CH(SO$_3$M)-CO-OR$^b$, in which $R^a$ represents a $C_8$-$C_{20}$, preferably $C_{10}$-$C_{16}$ alkyl radical, $R^b$ represents a $C_1$-$C_6$, preferably $C_1$-$C_3$ radical and M represents an alkali metal cation (sodium, potassium, lithium), a substituted or unsubstituted ammonium (methyl-, dimethyl-, trimethyl-, tetramethylammomium, dimethylpiperidinium) or a derivative of an alkanolamine (monoethanolamine, diethanolamine, triethanolamine), alkyl sulfates of formula $R^cOSO_3M$, in which $R^c$ represents a $C_{10}$-$C_{24}$, preferably $C_{12}$-$C_{20}$ alkyl or hydroxyalkyl radical, M representing a hydrogen atom or a cation having the same definition as above, and also the ethoxylenated (EO) and/or propoxylenated (PO) derivatives thereof having preferably from 1 to 20 EO units, alkylamide sulfates of formula $R^dCONHR^eOSO_3M$, in which $R^d$ represents a $C_2$-$C_{22}$, preferably $C_6$-$C_{20}$, alkyl radical, $R^e$ represents a $C_2$-$C_3$ alkyl radical, M representing a hydrogen atom or a cation having the same definition as above, and also the ethoxylenated (EO) and/or propoxylenated (PO) derivatives thereof having preferably from 1 to 20 EO units, salts of saturated or unsaturated $C_8$-$C_{24}$, preferably $C_{14}$-$C_{20}$, fatty acids, $C_9$-$C_{20}$ alkylbenzene sulfonates and also the ethoxylenated (EO) and/or propoxylenated (PO) derivatives thereof having preferably from 1 to 20 EO units, —$C_9$-$C_{20}$ alkylbenzene sulfonates, primary or secondary $C_8$-$C_{22}$ alkyl sulfonates, alkyl glyceryl sulfonates, the sulfonated polycarboxylic acids described in GB-A-1 082 179, paraffin sulfonates, N-acyl N-alkyl taurates, monoalkyl and dialkyl phosphates, alkyl isethionates, alkyl succinamates, alkyl sulfosuccinates, sulfosuccinate monoesters or diesters, N-acyl sarcosinates, alkyl glycoside sulfates, polyethoxycarboxylates, the cation being an alkali metal (sodium, potassium, lithium), a substituted or unsubstituted ammonium residue (methyl-, dimethyl-, trimethyl-, tetramethylammonium, dimethylpiperidinium) or a derivative of an alkanolamine (monoethanolamine, diethanolamine, triethanolamine).

As nonionic surfactants, mention may be made of poly(alkylene oxide) alkyl or aryl ethers, polyoxyethylenated sorbitan hexastearate, polyoxyethylenated sorbitan oleate and poly(ethylene oxide) cetylstearyl ethers. As poly(alkylene oxide) aryl ether, mention may be made of polyoxyethylenated alkylphenols. As poly(alkylene oxide) alkyl ether, mention may be made of polyethylene glycol isodecyl ether and polyethylene glycol trimethylnonyl ether containing from 3 to 15 ethylene oxide units per molecule.

Mention may also be made, as examples of surfactants, of: ionic, non-ionic or amphoteric fluorinated surfactants and mixtures thereof, for example:
perfluoroalkyls,
perfluorobetaines,
ethoxylated polyfluoroalcohols,
polyfluoroalkylammoniums,
surfactants in which the hydrophilic part contains one or more saccharide unit(s) bearing from five to six carbon atoms and in which the hydrophobic part contains a unit of formula $R^f(CH_2)_n$—, in which n=2 to 20 and Rf represents a perfluoroalkyl unit of formula $C_mF_{2m+1}$, in which m=1 to 10; and polyelectrolytes having fatty perfluoroalkyl side groups.

"Fluorinated surfactant" is intended to mean, as is entirely know per se, a compound made up of an aliphatic perfluorocarbon-based part, composing at least three cartoon atoms, and an ionic, nonionic or amphoteric hydrophilic part. The perfluorocarbon-based part having at least three carbon atoms may represent either all, or only a fraction, of the fluorocarbon-based part of the molecule. Regarding this type of compound, a large number of references are found in the literature. Those skilled in the art may refer especially to the following references:

FR-A-2 149 519, WO-A-94 21 233, U.S. Pat. No. 3,194,767, the book "Fluorinated Surfactants", Erik Kissa, Editor Marcel Dekker Inc. (1994) chapter 4, especially tables 4.1 and 4.4.

Mention may in particular be made of the products sold by Du Pont under the name ZONYL®, for example FSO, FSN-100, FS-300, FSD, and also the FORAFAC® fluorinated surfactants distributed by DU PONT and the products sold under the name FLUORAD® by 3M.

Among these surfactants, mention will in particular be made of anionic, cationic, nonionic and amphoteric perfluoroalkylated compounds, and among them, more particularly, the surfactants of the class of ZONYL® sold by DU Pont, sold by Du Pont respectively under the names ZONYL® FSA, ZONYL® FSO, ZONYL® FSC and ZONYL® FSK.

The following may also be specified with respect thereto:
ZONYL® FSO 100: CAS 65545-80-4, (nonionic) 99 to 100%, the remainder being 1,4-dioxane.
ZONYL® FSN: CAS 65545-80-4, 99 to 100%, the remainder being sodium acetate and 1,4-dioxane,
ZONYL® FS-300: CAS 65545-80-4, 40%, the remainder being 1,4-dioxane (<0.1%) and wader
ZONYL® FSD: CAS 70983-60-7 30%, (cationic), the remainder being hexylene glycol (10%), sodium chloride (3%) and water (57%).

Mention may also be made of:
perfluoroalkyl betaines (amphoteric) such as that sold by DU PONT under the name FORAFAC® 1157, ethoxylated polyfluoroalcohols (nonionic), such as that sold by DU PONT under the name FORAFAC 1110 D, polyfluoroalkylammonium salts (cationic), such as that sold by DU PONT under the name FORAFAC 1179;
surfactants in which the hydrophilic part contains one or more saccharide unit(s) containing from 5 to 6 carbon atoms (units derived from sugars such as fructose, glucose, mannose, galactose, talose, gulose, allose, altose, idose, arabinose, xylose, lyxose and/or ribose) and in which the hydrophobic part contains a unit of formula $R^F(CH_2)_n$, where n may range from 2 to 20, preferably from 2 to 10 and $R^F$ represents a perfluoroalkyl unit of formula $C_mF_{2m+1}$ with m possibly ranging from 1 to 10, preferably from 4 to 8, chosen from those having the features defined above; mention may be made of monoesters of perfluoroalkylated fatty acids and of sugars such as sucrose, it being possible for the monoester function to do represented by the formula $R^F(CH_2)_nC(O)$, where n may range from 2 to 10 and $R^F$ represents a perfluoroalkyl unit of formula $C_mF_{2m+1}$ with m possibly ranging from 4 to 8, described in Journal of the American Oil Chemists' Society (JAOCS). Vol. 69, No. 1 (January 1992) and chosen from those having the features defined above; and polyelectrolytes having fatty perfluoroalkyl side groups, such as polyacrylates having $R^F(CH_2)_n$ groups where n may range from 2 to 20, preferably from 2 to 10 and $R^F$ represents a perfluoroalkyl unit of formula $C_mF_{2m+1}$ with m possibly ranging from 1 to 10, preferably from 4 to 8, chosen from those having the features defined above; mention may be made of polyacrylates having —$CH_3C_7F_{15}$ groups described in J. Chim. Phys. (1996) 93, 887-898 and chosen from those having the features defined above.

The amount of surfactant (E) depends on the type of each of the constituents present and also the very nature of the surfactant used. As a general rule, the emulsion composes from 0.5 to 10% by weight of surfactant relative to the total weight of the emulsion.

Furthermore, conventionally and nonlimitingly, use may also be made, in the emulsions, of additives (F) such as film-forming polymers, antifoam adjuvants, biocides, rheology modifiers, coalescence agents, dispersing agents, acidifying agents, neutralizes, bases and/or thickeners, alone or as a mixture.

The concentrations of such adjuvants are known to those skilled in the art.

The polyorganosiloxanes of the mold release agent composition (I) are polymerizable and/or crosslinkable by dehydrogenation-condensation ($\equiv SiH + \equiv SiOH \rightarrow \equiv Si-O-Si \equiv + H_2(g)$).

To this end, at least one dehydrogenation-condensation catalyst may be used. The dehydrogenation-condensation catalyst (G) may be present in the composition according to the invention. Its presence is only optional due to the temperatures encountered within the context of the application.

Examples of dehydrogenation-condensation catalysts of use within the context of the invention are organometallic salts, and titanates such as tetrabutyl orthotitanate.

As organometallic salt, mention may be made of zirconium naphthenete and zirconium octylate.

Use may also be made of a catalytic tin compound, generally an organotin salt. The organotin salts of use are described in particular in the book by NOLL, Chemistry and Technology of Silicones, Academic Press (1968), page 397. It is also possible to define, as catalytic tin compound, either distannoxanes, or polyorganostannoxanes, or the reaction product of a tin salt, in particular a tin dicarboxylate, with polyethyl silicate, as described in U.S. Pat. No. 3,862,919.

The reaction product of an alkyl silicate or of an alkyltrialkoxysilane with dibutyltin diacetate, as described in the Belgian patent BE-A-842 305, may also be suitable.

According to another possibility, use may be made of a tin(II) salt, such as $SnCl_2$ or stannous octoate. The catalyst may be a tin salt of an organic acid, such as dibutyltin diacetate, dibutyltin dilaurate, dioctyltin dilaurate, dibutyltin dioctate, cobalt octylate and dioctyltin di(isomercaptoacetate). Examples of tin salts such as tin bischelates are described in patent applications EP-A-147 323 and EP-A-235 049, diorganotin dicarboxylates and, in particular, the catalysts are described in British patent GB-A-1 289 900 (dibutyltin or dioctyltin diacetate, dibutyltin or dioctyltin dilaurate).

Tin-free catalysts are also described in patent applications WO2010/146253, WO2010146254, WO2010/149869, WO2010/149870 and WO2013/004926.

The dehydrogenation-condensation catalyst, when it is present is generally introduced into the emulsion in an amount of from 0.05 to 5 parts by weight, relative to the total weight of the emulsion.

The water (H) is preferably present in proportions of between 20 and 90% and preferably between 30 and 80% by weight relative to the total weight of the composition.

According to another embodiment, the mold release agent composition (I) comprises
from 0.1 to 30 parts by weight of at least one constituent (A),
from 0.1 to 20 parts by weight of at least one constituent (B),
from 0.1 to 30 parts by weight of at least one constituent (C),
from 0.1 to 20 parts by weight of at least one constituent (D),
from 0.1 to 10 parts by weight of at least one constituent (E),
from 0 to 5 parts by weight of the constituents (F),
from 0 to 5 parts by weight of at least one constituent (G),
from 20 to 90 parts by weight of the constituent (H);
per 100 parts by weight of the sum of the constituents (A) to (H).

According to another preferential embodiment, the mold release agent composition (I) comprises:
from 1 to 20 parts by weight of at least one constituent (A),
from 1 to 10 parts by weight of at least one constituent (B),
from 1 to 20 parts by weight of at least one constituent (C),
from 0.1 to 15 parts by weight of at least one constituent (D),
from 0.1 to 10 parts by weight of at least one constituent (E),
from 0 to 5 parts by weight of the constituents (F),
from 0 to 5 parts by weight of at least one constituent (G),
from 30 to 80 parts by weight of the constituent (H);
per 100 parts by weight of the sum of the constituents (A) to (H).

Another subject of the present invention relates to a process for lubrication (P1) of an expandable rubber bladder of use during a vulcanization of a green tire within a metal press, characterized in that the outer surface of said bladder, intended to be in contact with the inner face of said green tire, is coated with a mold release agent composition (I) in the form of an oil-in-water emulsion comprising:

(a) at least one reactive polyorganosiloxane (A) composing at least two silanol groups $\equiv SiOH$ per molecule;

(b) at least one crosslinking agent (B) having at least three $\equiv SiH$ units per molecule;

(c) at least one non-reactive linear polyorganosiloxane oil (C) which is a linear homopolymer or copolymer which has, per molecule, monovalent organic substituents, which are identical to or different from one another, bonded to the silicon atoms, and which are selected from the group consisting of $C_1$-$C_6$ alkyl radicals, $C_3$-$C_8$ cycloalkyl radicals, $C_6$-$C_{10}$ aryl radicals and $C_7$-$C_{15}$ alkylaryl radicals;

(d) glass beads (D) as spherical amorphous filler, the composition of which is as follows:
the content of silicon expressed as $SiO_2$ is less than 63% by weight,
the content of calcium expressed as $CaO$ is greater than 20% by weight,
the content of sodium expressed as $Na_2O$ is less than 2.9% by weight,
the content of aluminum expressed as $Al_2O_3$ is between 0.5% and 15% by weight,
the content of boron expressed as $B_2O_3$ is between 0.2% and 2.5% by weight, the content of potassium expressed as $K_2O$ is between 0.35% and 1% by weight, and the content of magnesium expressed as MgO is between 1% and 4% by weight, relative to the total weight of $SiO_2$, CaO, $Na_2O$, $Al_2O$, $B_2O_3$, $K_2O$ and MgO;

(e) at least one surfactant (E);

(f) optionally at least one additive (F) selected from the group consisting of: a film-forming polymer, a complementary lubricant, an antifriction agent, a coalescence agent, a wetting or dispersing agent, a mineral filler, an antifoam agent, a thickener, a stabilizer, an acidifying agent, a biocide and an antifungal agent;

(g) optionally at least one dehydrogenation-condensation catalyst (G); and (h) water (H);

the amounts of surfactant(s) and water being sufficient to obtain an oil-in-water emulsion;

said process thus making it possible to directly obtain an expandable rubber bladder lubricated on the outer surface thereof and leading to several cycles of green tire molding and Of vulcanized tire demolding.

It is understood that the preferred variants of the mold release agent composition (I) according to the invention are also preferred embodiments of the processes (P1) and (P2) according to the invention.

The bladder treated according to the process of the invention has simultaneously excellent properties of slip and of durability.

Another subject of the present invention relates to a process for lubrication (P2) of an expandable rubber bladder of use during a vulcanization of a green tire within a metal press, characterized in that, in a first step outside the press, the inner surface of said green tire is coated with a mold release agent composition (I) in the form of an oil-in-water emulsion comprising:

(a) at least one reactive polyorganosiloxane (A) comprising at least two ≡SiOH groups per molecule;

(b) at least one crosslinking agent (B) having al least three ≡SiH units per molecule;

(c) at least one non-reactive linear polyorganosiloxane oil (C) which is a linear homopolymer or copolymer which has, per molecule, monovalent organic substituents, which are identical to or different from one another, bonded to the silicon atoms, and which are selected from the group consisting of $C_1$-$C_6$ alkyl radicals, $C_3$-$C_8$ cycloalkyl radicals, $C_6$-$C_{10}$ aryl radicals and $C_7$-$C_{15}$ alkylaryl radicals;

(d) glass beads (D) as spherical amorphous filler, the composition of which is as fellows:

the content of silicon expressed as $SiO_2$ is less than 63% by weight, the content of calcium expressed as CaO is greater than 20% by weight, the content of sodium expressed as $Na_2O$ is less than 2.9% by weight, the content of aluminum expressed as $Al_2O_3$ is between 0.5% and 15% by weight, the content of boron expressed as $B_2O_3$ is between 0.2% and 2.5% by weight, the content of potassium expressed as $K_2O$ is between 0.35% and 1% by weight, and the content of magnesium expressed as MgO is between 1% and 4% by weight, relative to the total weight of $SiO_2$, CaO, $Na_2O$, $Al_2O$, $B_2O_3$, $K_2O$ and MgO;

(e) at least one surfactant (E);

(f) optionally at least one additive (F) selected from the group consisting of: a film-forming polymer, a complementary lubricant, an antifriction agent, a coalescence agent, a wetting or dispersing agent, a mineral filler, an antifoam agent, a thickener, a stabilizer, an acidifying agent, a biocide and an antifungal agent;

(g) optionally at least one dehydrogenation-condensation catalyst (G); and (h) water (H);

the amounts of surfactant(s) and water being sufficient to obtain an oil-in-water emulsion;

said step thus making it possible to obtain a green tire, the inner surface of which is coated with said composition (I) and during a subsequent step within the metal press, the green tire, the inner surface of which is coated with the composition (I), is brought into contact with an expandable rubber bladder;

said process thus making it possible to obtain, by transfer, an expandable rubber bladder lubricated on the outer face thereof and leading to several cycles of green tire molding and of vulcanized tire demolding.

The number of cycles of green tire molding and of vulcanized tire demolding is greater than or equal to 8.

The methods of application of the treatments are well known to those skilled in the art. They can particularly be applied by brush, sponge or spraying.

The application by spraying may be carried out in several passes in order to ensure that the coating is uniform and homogeneous.

According to another embodiment, the mold release agent composition (I) used in the process (P1) or (P2) according to the invention is characterized in that it comprises:

from 0.1 to 30 parts by weight of at least one constituent (A) comprising at least two silanol groups ≡SiOH per molecule, from 0.1 to 20 parts by weight of at least one constituent (B) having at least three ≡SiH units per molecule, from 0.1 to 30 parts by weight of at least one constituent (C) which is a linear homopolymer or copolymer which has, per molecule, monovalent organic substituents, which are identical to or different from one another, bonded to the silicon atoms, and which are selected from the group consisting of $C_1$-$C_6$ alkyl radicals, $C_3$-$C_8$ cycloalkyl radicals, $C_6$-$C_{10}$ aryl radicals and $C_7$-$C_{15}$ alkylaryl radicals, from 0.1 to 20 parts by weight of glass beads (D) as spherical amorphous filler, the composition of which is as follows:

the content of silicon expressed as $SiO_2$ is less than 63% by weight, the content of silicon expressed as $SiO_2$ is less than 63% by weight, the content of calcium expressed as CaO is greater than 20% by weight, the content of sodium expressed as $Na_2O$ is less than 2.9% by weight, the content of aluminum expressed as $Al_2O_3$ is between 0.5% and 15% by weight, the content of boron expressed as $B_2O_3$ is between 0.2% and 2.5% by weight, the content of potassium expressed as $K_2O$ is between 0.35% and 1% by weight, and the content of magnesium expressed as MgO is between 1% and 4% by weight, relative to the total weight of $SiO_2$, CaO, $Na_2O$, $Al_2O$, $B_2O_3$, $K_2O$ and MgO;

from 0.1 to 10 parts by weight of at least one surfactant (E), from 0 to 5 parts by weight of at least one additive (F), selected from the group consisting of: a film-forming polymer, a complementary lubricant, an antifriction agent, a coalescence agent, a wetting or dispersing agent, a mineral filler, an antifoam agent, a thickener, a stabilizer, an acidifying agent, a biocide and an anti-fungal agent;

from 0 to 5 parts by weight of at least one dehydrogenation-condensation catalyst (G);

from 20 to 90 parts by weight of water (H);

per 100 parts by weight of the sum of the constituents (A) to (H).

Another subject of the present invention is that of proposing a process for vulcanizing a green tire, employing a bladder lubricated by the process according to the invention.

More particularly, the invention relates to:
- an expandable rubber bladder, coated on its outer surface with a composition (I) according to the invention, for shaping and vulcanizing green tires;
- an expandable rubber bladder that can be obtained by healing the expandable bladder defined above, especially between 80° C. and 220° C., preferably between 150° C. and 200° C., so as to ensure the complete crosslinking of the crosslinkable constituents of the emulsion;
- a green tire coated on its inner surface with a lubricating composition (I) according to the invention.

Once lubricated, the bladder differs from a conventional dilatable bladder in that it is covered with a crosslinked silicone film encrusted with glass beads (D), the chemical composition of which is the following:
- the content of silicon expressed as $SiO_2$ is less than 63% by weight,
- the content of calcium expressed as CaO is greater than 20% by weight,
- the content of sodium expressed as $Na_2O$ is less than 2.9% by weight,
- the content of aluminum expressed as $Al_2O_3$ is between 0.5% and 15% by weight,
- the content of boron expressed as $B_2O_3$ is between 0.2% and 2.5% by weight,
- the content of potassium expressed as $K_2O$ is between 0.35% and 1% by weight, and
- the content of magnesium expressed as MgO is between 1% and 4% by weight, relative to the total weight of $SiO_2$, CaO, $Na_2O$, $Al_2O$, $B_2O_3$, $K_2O$ and MgO.

The other constituent compounds of the emulsion, except for the volatile compounds (for example water), are present in the silicone film at the surface of the bladder.

The silicone film encrusted with glass beads (D) at the surface of the bladder is not easily eliminated since it withstands several cycles of molding of the green tire and of demolding of the vulcanized tire. The number of cycles of green-tire molding and of vulcanized-tire demolding is greater than or equal to 8.

The compositions according to the invention have improved stability in terms of pH and release of hydrogen, which minimizes the health and safety risks for operators and industrial facilities, and the silicone coatings prepared from the compositions according to the invention simultaneously have:
- a transparent surface appearance,
- good lubrication properties (Kd<0.7), and
- good resistance to successive demolding operations (number of demolding operations >8).

Other advantages and features of the present invention will appear on reading the following examples that are given by way of illustration and that are in no way limiting.

EXAMPLES

1) Raw Materials Used

Bluesil® Emulsion 242 sold by Bluestar Silicones: emulsion of α, ω-bis(hydroxy)polydimethylsiloxane oil having a viscosity of approximately 135 000 mPa·s at 25° C. (A) and comprising a surfactant (E).

Bluesil® Emulsion 247G—Bluestar Silicones: emulsion of a mixture of αω-bis(hydroxy)polydimethylsiloxane (A) gum having a consistency of approximately 700 expressed in tenths of a millimeter at 25° C. and of polydimethylsiloxane oil (C) having a viscosity of approximately 50 mPa·s at 25° C. and comprising a surfactant (E).

Bluesil® Emulsion 269 sold by Bluestar Silicones: emulsion of polymethylhydrosiloxane oil having a viscosity of approximately 25 $mm^2/s$ at 25° C. (B) and comprising a surfactant (E)

Spheriglass® 3000A CP00 sold by Potters: soda-lime glass beads non-surface-coated with a coupling agent, having a mean diameter of 12-26 μm (D) measured according to standard ISO 13320 (type A).

Spheriglass® 3000E CP03 sold by Potters: borosilicate glass beads surface-coated with a coupling agent, having a mean diameter of 12-26 μm (D) measured according to standard ISO 13320 (type E).

GlassyCoat® C3 SP 20-60 TO sold by Sovitec: non-surface-coated glass beads, D50 15-30 μm (type X).

Rhodopol® 23 sold by Solvay Novecare: xanthan gum, thickener (F).

Imbentin® T/050 sold by Dr Kolb; Isotrideceth 5, wetting agent (F).

Silcolapse® 5001 sold by Bluestar Silicones: antifoam emulsion (F).

Proxel® GXL sold by Arch Chemicals: 1,2-benzisothiazolin-3-one, biocide (F).

The % indicated below are by weight relative to the total weight of the composition.

2) Preparation of the Examples

In all the examples, the percentages (%) mentioned are expressed by weight relative to the total weight of all the constituents of the formulation.

Comparative Example 1 (C1): Formulation with Type A Glass Beads

In a 2-liter beaker with a diameter of 120 mm, produce a first mixture (M1):
- introduce 47.46% of water (H) and stir at 100 rpm using a disperser equipped with a deflocculating impeller having a diameter of 100 mm;
- then introduce 0.62% Imbentin® T/050 (F), 1.8% Silcolapse® 5001 (F) and 3% Spheriglass® 3000A CP00;
- increase the speed to 600 rpm and introduce 0.26% Rhodopol® 23 (F);
- disperse for 10 min at 600 rpm and stop the disperser.

At the same time, in a 1-liter beaker with a diameter of 90 mm, prepare a second mixture (M2):

introduce 30% Bluesil® Emulsion 247G (A & C) and stir at 100 rpm using a disperser fitted with an anchor impeller having a diameter of 80 mm, then introduce 7.47% Bluesil® Emulsion 242 (A), 0.15% Proxel® GXL (F), 0.06% of phosphoric acid (F), and homogenize for 5 min, and finally introduce 9.15% Bluesil® Emulsion 269 (B). homogenize for 5 min.

Finally, introduce the mixture (M2) into (M1) while stirring at 300 rpm using a disperser equipped with an anchor impeller having a diameter of 80 mm and homogenize for 30 min. After homogenization, the mold release agent composition (C1) is obtained.

Comparative Example 2 (C2): Formulation with Type E Glass Beads

In a 2-liter beaker with a diameter of 120 mm, produce a first mixture (Q1):

introduce 47.91% of water (H) and stir at 100 rpm using a disperser equipped with a deflocculating impeller having a diameter of 100 mm;

then introduce 0.2% Imbentin® T/050 (F), 1.8% Silcolapse® 5001 (F) and 3% Spheriglass® 3000E CP03;

increase the speed to 600 rpm and introduce 0.26% Rhodopol® 23 (F);

disperse for 10 min at 600 rpm and stop the disperser.

At the same time, in a 1-liter beaker with a diameter of 90 mm, prepare a second mixture (Q2):

introduce 30% Bluesil® Emulsion 247G (A & C) and stir at 100 rpm using a disperser fitted with an anchor impeller having a diameter of 80 mm, then introduce 7.48% Bluesil® Emulsion 242 (A), 0.15% Proxel® GXL (F), 0.06% of phosphoric acid (F), and homogenize for 5 min, and finally introduce 9.15% Bluesil® Emulsion 269 (B). homogenize for 5 min.

Finally, introduce the mixture (Q2) into (Q1) while stirring at 300 rpm using a disperser equipped with an anchor impeller having a diameter of 80 mm and homogenize for 30 min. After homogenization, the mold release agent composition (C2) is obtained.

Example According to the Invention (E1): Formulation with Type X Glass Beads The procedure of comparative example 2 is followed but the type E glass beads are replaced with type X glass beads, GlassyCoat® C3 SP 20-60 TO batch 1.

Example According to the Invention (E2): Formulation with Type X Glass Beads The procedure of comparative example 2 is followed but the type E glass beads are replaced with type X glass beads, GlassyCoat® C3 SP 20-60 TO batch 2.

Example According to the Invention (E3): Formulation with Type X Glass Beads The procedure of comparative example 2 is followed but the type E glass beads are replaced with type X glass beads, GlassyCoat® C3 SP 20-60 TO batch 3.

3) Characterization Tests

Elemental Analysis of the Batches of Glass Beads (D)

The elemental analysis of the batches of glass beads is carried out by plasma torch atomic emission spectrometry according to standard ISO 21587 (2007). Mention may be made, as an example of apparatus which can be used, of: ICP Varian Vista Pro or ICP Jobin Yvon Ultima 2.

Measuring the pH of the Formulations

The pH of the formulations is measured using a pH meter equipped with a glass electrode and a reference electrode. The apparatus is calibrated every week with buffer solutions of pH=4, 7 and 11. The measurements are carried out at the ambient temperature of the laboratory. The apparatus automatically compensates the temperature variations of the measurement.

Measuring the Hydrogen Release of the Formulations

The measurement of the hydrogen release on compositions stored at 50° C. is carried out by gas chromatography equipped with katharometric detection.

The results of the analysis are expressed as ml/kg/day.

The properties of the mold release agent compositions (I) are measured by evaluating the coefficients of friction and the number of demolding operations earned out without defects.

A low coefficient of friction reflects good slip properties.

A high number of demolding operations reflects high durability of the lubrication of the bladder.

The tests for measuring the coefficients of friction and the durability were adapted to the application of the lubricating composition to expandable rubber bladder.

Slip Test

The aim of this test is to assess the slip ability of a mold release agent composition placed at the interface between the expandable bladder and the inner surface of the casing of a tire.

This test is carried out by sliding a metal block of predetermined weight, under which a tire casing film (50×75 mm) is attached, over a rubber surface, the composition of which is that of the expandable bladder.

The surface of the expandable bladder is pre-coated with the mold release agent composition.

The friction coefficient is measured using a tens to meter (at a speed of 50 mm/min). Five successive passes are earned out on the same expandable bladder sample, the tire casing sample being changed each time.

The friction coefficient (Kd) corresponds to:

$$Kd(\text{dimensionless}) = \frac{\text{average force for conveying the block (in } N)}{\text{weight of the block (in } N)}$$

The value of Kd mentioned in table 1 corresponds to the average of values obtained during the 5 passes.

The lower the friction coefficient values, the better the slip properties of the lubricating composition will be.

This slip test is perfectly representative of the performance to be achieved on industrial tooling, and is a first selection criterion.

Demolding Test

The durability of a lubricating composition corresponds to the number of tires produced without degradation of the surface of the expandable bladder.

For this purpose, an expandable bladder film, pro-coated with the mold release agent composition to be evaluated, is pressed into contact with an unvulcanised tire casing film in a series of pressure and temperature cycles that simulate the steps of manufacturing a tire on industrial tooling.

In detail, a sheet of rubber, having a composition identical to that of the bladder and having a size of 2 mm×80 mm×80 mm is prepared in a heated press at 200° C. for 30 minutes. The sheet is surface-structured to simulate the surface of a bladder.

This sheet is coated in a paint booth by spraying the mold release agent composition with a compressed air spray gun. A layer of around 20 μm is deposited. After drying in air, the assembly is cured at 170° C. for at least 10 minutes.

The coated sheet is placed in a metal mold in a press. The platens are heated at 170° C. The sheet is left to preheat for 5 minutes, then a piece of green ILR (inner liner rubber, i.e. rubber that forms the inner surface of a green tire) having a thickness of around 9 cm is deposited on the sheet coated with the mold release agent composition. The mold is closed, followed by the press, and the ILR is left to cure for 7 minutes at 170° C. The mold is opened and the thin molded ILR sheet is removed.

In order for a demolding operation to be considered to be successful, the sheet must be separated without applying force and without sticking. Otherwise, the demolding operation is recorded as a failure.

The number of demolding operations corresponds to the number of ILR sheets removed from the mold without sticking.

4) Elemental Analysis of the Different Types of Glass Bead

| Composition of the glass | Glass beads | Glass beads | Glass beads type X | | |
|---|---|---|---|---|---|
| % by weight | type A | type E | Batch 1 | Batch 2 | Batch 3 |
| $SiO_2$ (%) | 74.5 | 64.2 | 61.4 | 62.1 | 57.9 |
| $Na_2O$ (%) | 12.4 | 3.2 | 0.5 | 2.5 | 2.2 |
| CaO (%) | 9.2 | 18 | 22.5 | 22.5 | 24.4 |
| MgO (%) | 2.6 | 2.4 | 2.6 | 3.0 | 3.0 |
| $Al_2O_3$ (%) | 0.9 | 9 | 12.3 | 9.2 | 11.2 |
| $B_2O_3$ (%) | 0.1 | 3 | 0.4 | 0.3 | 0.8 |
| $K_2O$ (%) | 0.3 | 0.2 | 0.4 | 0.5 | 0.6 |
| TOTAL | 100 | 100 | 100 | 100 | 100 |

The type X glass beads have the desired features, namely:
- the content of silicon expressed as $SiO_2$ is less than 63% by weight,
- the content of calcium expressed as CaO is greater than 20% by weight,
- the content of sodium expressed as $Na_2O$ is less than 2.9% by weight,
- the content of aluminum expressed as $Al_2O_3$ is between 0.5% and 15% by weight,
- the content of boron expressed as $B_2O_3$ is between 0.2% and 2.5% by weight,
- the content of potassium expressed as $K_2O$ is between 0.35% and 1% by weight, and
- the content of magnesium expressed as MgO is between 1% and 4% by weight, relative to the total weight of $SiO_2$, CaO, $Na_2O$, $Al_2O$, $B_2O_3$, $K_2O$ and MgO.

5) Monitoring the pH of the Compositions Formulated with the Different Glass Beads Stored at 50° C.

| Number of days of storage at 50° C. | Comparative test C1 Type A glass beads | Comparative test C2 Type E glass beads | Tests according to the invention, type X glass beads | | |
|---|---|---|---|---|---|
| | | | E1 Batch 1 | E2 Batch 2 | E3 Batch 3 |
| 0 | 4.7 | 4.2 | 4.2 | 4.7 | 4.3 |
| 11 | 7.0 | 6.2 | 4.5 | 4.9 | 4.5 |
| 15 | 7.1 | 6.5 | 4.4 | 4.8 | 4.5 |
| 30 | 7.2 | 6.8 | 4.2 | 4.8 | 4.5 |
| 45 | 7.2 | 7.6 | 4.3 | 4.7 | 4.5 |
| 60 | 7.3 | — | 3.7 | 5.0 | 4.4 |

Compared to the comparative tests C1 and C2, the pH of which changes quickly and significantly at 50° C. (+49% in 11 days and +55% in 60 days for C1), the pH of the compositions according to the invention (E1, E2 and E3), namely in the presence of type X glass beads, virtually does not change at all (+4% in 11 days and 6.4% in 60 days for E2).

The pH of the compositions according to the invention does not increase on storage by more than 10% relative during a period of 60 days at 50° C., equivalent to one year at ambient temperature.

6) Measurement of Hydrogen Release During Storage of the Compositions Formulated with the Different Glass Beads

| Hydrogen release expressed as ml/kg/day Storage at 50° C. for 50 days | | | | |
|---|---|---|---|---|
| Comparative test C1 | Comparative test C2 | Tests according to the invention Type X glass beads | | |
| Type A glass beads | Type E glass beads | E1 Batch 1 | E2 Batch 2 | E3 Batch 3 |
| 110 | 85 | 30 | 50 | 55 |

The hydrogen release of a mold release agent compositor according to the invention is on average 45 ml/kg/day at 50° C., i.e. a reduction of 59% relative to the comparative example C1 and a reduction of 47% relative to the composition of the comparative example C2.

7) Measurement of the Coefficient of Friction of the Coatings Obtained with the Compositions Formulated with the Different Glass Beads

| Number of months of storage at ambient temperature | Coefficient of friction (Kd) | |
|---|---|---|
| | Comparative test C1 Type A glass beads | Tests according to the invention, type X glass beads E2 Batch 2 |
| 1 | 0.33 | 0.29 |
| 2 | 0.37 | 0.31 |
| 3 | 0.36 | 0.33 |
| 4 | 0.39 | 0.3 |

The composition according to the invention leads to a coefficient of friction Kd<0.7.

8) Measurement of the Number of Demolding Operations of the Compositions Formulated with the Different Glass Beads

| Number of months of storage at ambient temperature | Number of demolding operations | |
|---|---|---|
| | Comparative test C1 Type A glass beads | Tests according to the invention, type X glass beads E2 Batch 2 |
| 1 | 10 | 14 |
| 2 | 8 | 12 |
| 3 | 6 | 12 |
| 4 | 6 | 8 |

The use of type X glass beads in the composition according to the invention does not degrade the number of demolding operations.

Compared to the comparative example (C1), the use of type X glass beads in a mold release agent composition does not degrade the number of demolding operations and therefore the durability of the bladder, with simultaneously good slip properties.

In conclusion, the use of type X glass beads, unlike type A or E glass beads, makes it possible to stabilize the pH of the mold release agent compositions and to avoid the loss of SiH, and therefore the release of hydrogen, without degrading the application properties.

The invention claimed is:

1. A mold release agent composition (I) in emulsion form, the composition comprising:
   (a) at least one reactive polyorganosiloxane (A) comprising at least two silanol groups ≡SiOH per molecule;
   (b) at least one crosslinking agent (B) having at least three ≡SiH units per molecule;
   (c) at least one non-reactive linear polyorganosiloxane oil (C) which is a linear homopolymer or copolymer which has, per molecule, monovalent organic substituents, which are identical to or different from one another, bonded to the silicon atoms, and which are selected from the group consisting of $C_1$-$C_6$ alkyl radicals, $C_3$-$C_8$ cycloalkyl radicals, $C_6$-$C_{10}$ aryl radicals and $C_7$-$C_{15}$ alkylaryl radicals;
   (d) glass beads (D) as spherical amorphous filler;
   (e) at least one surfactant (E);
   (f) optionally at least one additive (F) selected from the group consisting of: a film-forming polymer, a complementary lubricant, an antifriction agent, a coalescence agent, a wetting or dispersing agent, a mineral filler, an antifoam agent, a thickener, a stabilizer, an acidifying agent, a biocide and an antifungal agent;
   (g) optionally at least one dehydrogenation-condensation catalyst (G); and
   (h) water (H);
   the amounts of surfactant(s) and water being sufficient to obtain an oil-in-water emulsion;
   wherein the composition of the glass beads (D) is as follows:
   the content of silicon expressed as $SiO_2$ is less than 63% by weight,
   the content of calcium expressed as CaO is greater than 20% by weight,
   the content of sodium expressed as $Na_2O$ is less than 2.9% by weight,
   the content of aluminum expressed as $Al_2O_3$ is from 0.5% to 15% by weight,
   the content of boron expressed as $B_2O_3$ is from 0.2% to 2.5% by weight,
   the content of potassium expressed as $K_2O$ is from 0.35% to 1% by weight, and
   the content of magnesium expressed as MgO is from 1% to 4% by weight,
   relative to the total weight of $SiO_2$, CaO, $Na_2O$, $Al_2O_3$, $B_2O_3$, $K_2O$ and MgO.

2. The mold release agent composition (I) as claimed in claim 1, wherein that the amount of glass beads (D) is from 0.1% to 20% by weight relative to the total weight of the composition.

3. The mold release agent composition (I) as claimed in claim 1, wherein the reactive polyorganosiloxane (A) comprises the following siloxy units:

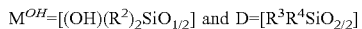

wherein:
$R^2$, $R^3$ and $R^4$ are identical or different radicals selected from the group consisting of:
linear or branched $C_1$-$C_6$ alkyl radicals
$C_3$-$C_8$ cycloalkyl radicals,
$C_6$-$C_{10}$ aryl radicals, and
$C_7$-$C_{15}$ alkylaryl radicals.

4. The mold release agent composition (I) as claimed in claim 3, wherein the radicals $R^2$, $R^3$ and $R^4$ of the siloxy units of the reactive polyorganosiloxane (A) are methyl radicals.

5. The mold release agent composition (I) as claimed in claim 1, wherein the crosslinking agent (B) is a polyorganosiloxane having at least one unit of formula (II) and which is terminated by units of formula (III) or cyclic units consisting of units of formula (II) represented below:

in which:
the symbols $R^1$ are identical or different and represent:
   a linear or branched alkyl radical containing 1 to 8 carbon atoms, which is unsubstituted or which is substituted by at least one fluorine,
   a cycloalkyl radical containing from 5 to 8 cyclic carbon atoms, or
   an aryl radical containing from 6 to 12 carbon atoms,
   an aralkyl radical having an alkyl part containing from 5 to 14 carbon atoms and an aryl part containing from 6 to 12 carbon atoms, unsubstituted or substituted on the aryl part with halogens, alkyls and/or alkoxyls containing 1 to 3 carbon atoms,
the symbols Z' are identical or different and represent:
   a hydrogen radical, or
   a group corresponding to the same definition as that given above for $R^1$,
with at least three of the symbols Z' per molecule representing H.

6. A process of lubricating an expandable rubber bladder during a vulcanization of a green tire within a metal press, the process comprising providing the bladder so that an outer surface of the bladder, intended to be in contact with an inner face of the green tire, is coated with a mold release agent composition (I) in the form of an oil-in-water emulsion, wherein the mold release agent composition comprises:
   (a) at least one reactive polyorganosiloxane (A) comprising at least two silanol groups ≡SiOH per molecule;
   (b) at least one crosslinking agent (B) having at least three ≡SiH units per molecule;
   (c) at least one non-reactive linear polyorganosiloxane oil (C) which is a linear homopolymer or copolymer which has, per molecule, monovalent organic substituents, which are identical to or different from one another, bonded to the silicon atoms, and which are selected from the group consisting of $C_1$-$C_6$ alkyl radicals, $C_3$-$C_8$ cycloalkyl radicals, $C_6$-$C_{10}$ aryl radicals and $C_7$-$C_{15}$ alkylaryl radicals;
   (d) glass beads (D) as spherical amorphous filler, the composition of which is as follows:
      the content of silicon expressed as $SiO_2$ is less than 63% by weight,
      the content of calcium expressed as CaO is greater than 20% by weight,
      the content of sodium expressed as $Na_2O$ is less than 2.9% by weight,
      the content of aluminum expressed as $Al_2O_3$ is from 0.5% to 15% by weight,
      the content of boron expressed as $B_2O_3$ is from 0.2% to 2.5% by weight,
      the content of potassium expressed as $K_2O$ is from 0.35% to 1% by weight, and
      the content of magnesium expressed as MgO is from 1% to 4% by weight,
   relative to the total weight of $SiO_2$, CaO, $Na_2O$, $Al_2O_3$, $B_2O_3$, $K_2O$ and MgO;
   (e) at least one surfactant (E);
   (f) optionally at least one additive (F) selected from the group consisting of: a film-forming polymer, a complementary lubricant, an antifriction agent, a coalescence agent, a wetting or dispersing agent, a mineral filler, an antifoam agent, a thickener, a stabilizer, an acidifying agent, a biocide and an antifungal agent;
   (g) optionally at least one dehydrogenation-condensation catalyst (G); and
   (h) water (H);
the amounts of surfactant(s) and water being sufficient to obtain an oil-in-water emulsion;
the process thus making it possible to directly obtain an expandable rubber bladder lubricated on the outer surface thereof and leading to several cycles of green tire molding and of vulcanized tire demolding.

7. A process of lubricating an expandable rubber bladder during a vulcanization of a green tire within a metal press, the process comprising in a first step outside the press, coating an inner surface of the green tire with a mold release agent composition (I) in the form of an oil-in-water emulsion that comprises:
   (a) at least one reactive polyorganosiloxane (A) comprising at least two ≡SiOH groups per molecule;
   (b) at least one crosslinking agent (B) having at least three ≡SiH units per molecule;
   (c) at least one non-reactive linear polyorganosiloxane oil (C) which is a linear homopolymer or copolymer which has, per molecule, monovalent organic substituents, which are identical to or different from one another, bonded to the silicon atoms, and which are selected from the group consisting of $C_1$-$C_6$ alkyls, $C_3$-$C_8$ cycloalkyls, $C_6$-$C_{10}$ aryls and $C_7$-$C_{15}$ alkylaryls;
   (d) glass beads (D) as spherical amorphous filler, the composition of which is as follows:
      the content of silicon expressed as $SiO_2$ is less than 63% by weight,
      the content of calcium expressed as CaO is greater than 20% by weight,
      the content of sodium expressed as $Na_2O$ is less than 2.9% by weight,
      the content of aluminum expressed as $Al_2O_3$ is from 0.5% to 15% by weight,
      the content of boron expressed as $B_2O_3$ is from 0.2% to 2.5% by weight,
      the content of potassium expressed as $K_2O$ is from 0.35% to 1% by weight, and
      the content of magnesium expressed as MgO is from 1% to 4% by weight,
   relative to the total weight of $SiO_2$, CaO, $Na_2O$, $Al_2O_3$, $B_2O_3$, $K_2O$ and MgO;
   (e) at least one surfactant (E);
   (f) optionally at least one additive (F) selected from the group consisting of: a film-forming polymer, a complementary lubricant, an antifriction agent, a coalescence agent, a wetting or dispersing agent, a mineral filler, an antifoam agent, a thickener, a stabilizer, an acidifying agent, a biocide and an antifungal agent;
   (g) optionally at least one dehydrogenation-condensation catalyst (G); and
   (h) water (H);
the amounts of surfactant(s) and water being sufficient to obtain an oil-in-water emulsion;
the first step thus making it possible to obtain a green tire, the inner surface of which is coated with the composition (I) and
during a subsequent step within the metal press, bringing the coated inner surface of the green tire into contact with an expandable rubber bladder;
the process thus making it possible to obtain, by transfer, an expandable rubber bladder lubricated on the outer face thereof and leading to several cycles of green tire molding and of vulcanized tire demolding.

8. The process of claim 6, wherein the mold release agent composition (I) comprises:

from 0.1 to 30 parts by weight of at least one constituent (A) comprising at least two silanol groups ≡SiOH per molecule, from 0.1 to 20 parts by weight of at least one constituent (B) having at least three ≡SiH units per molecule, from 0.1 to 30 parts by weight of at least one constituent (C) which is a linear homopolymer or copolymer which has, per molecule, monovalent organic substituents, which are identical to or different from one another, bonded to the silicon atoms, and which are selected from the group consisting of $C_1$-$C_6$ alkyls, $C_3$-$C_8$ cycloalkyls, $C_6$-$C_{10}$ aryls and $C_7$-$C_{15}$ alkylaryls, from 0.1 to 20 parts by weight of glass beads (D) as spherical amorphous filler, the composition of which is as follows:

the content of silicon expressed as $SiO_2$ is less than 63% by weight, the content of calcium expressed as CaO is greater than 20% by weight, the content of sodium expressed as $Na_2O$ is less than 2.9% by weight, the content of aluminum expressed as $Al_2O_3$ is from 0.5% to 15% by weight, the content of boron expressed as $B_2O_3$ is from 0.2% to 2.5% by weight, the content of potassium expressed as $K_2O$ is from 0.35% to 1% by weight, and the content of magnesium expressed as MgO is from 1% to 4% by weight, relative to the total weight of $SiO_2$, CaO, $Na_2O$, $Al_2O_3$, $B_2O_3$, $K_2O$ and MgO;

from 0.1 to 10 parts by weight of at least one surfactant (E), from 0 to 5 parts by weight of at least one additive (F), selected from the group consisting of: a film-forming polymer, a complementary lubricant, an antifriction agent, a coalescence agent, a wetting or dispersing agent, a mineral filler, an antifoam agent, a thickener, a stabilizer, an acidifying agent, a biocide and an antifungal agent;

from 0 to 5 parts by weight of at least one dehydrogenation-condensation catalyst (G);

from 20 to 90 parts by weight of water (H);

per 100 parts by weight of the sum of the constituents (A) to (H).

9. A lubricated bladder obtained by the process as described in claim 6.

10. A process of vulcanizing a green tire, the process comprising employing a lubricated bladder as described in claim 9.

11. The mold release agent composition (I) as claimed in claim 2, wherein the amount of glass beads (D) is from 0.1% to 15% by weight.

* * * * *